United States Patent
Tagaya et al.

(10) Patent No.: US 9,278,622 B2
(45) Date of Patent: Mar. 8, 2016

(54) VEHICLE BATTERY MANAGEMENT UNIT HAVING CELL BALANCER BASED ON CAPACITY DIFFERENCES OF BATTERY CELLS

(71) Applicant: MITSUBISHI JIDOSHA KOGYO KABUSHIKI KAISHA, Tokyo (JP)

(72) Inventors: Naoto Tagaya, Tokyo (JP); Katsuyoshi Muramatsu, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 294 days.

(21) Appl. No.: 13/937,316

(22) Filed: Jul. 9, 2013

(65) Prior Publication Data
US 2014/0015483 A1    Jan. 16, 2014

(30) Foreign Application Priority Data

Jul. 10, 2012 (JP) ................. 2012-154665

(51) Int. Cl.
*H02J 7/00* (2006.01)
*B60L 11/18* (2006.01)
*H01M 10/44* (2006.01)

(52) U.S. Cl.
CPC ......... *B60L 11/1809* (2013.01); *B60L 11/1866* (2013.01); *H02J 7/0014* (2013.01); *H02J 7/0016* (2013.01); *H01M 10/44* (2013.01); *H01M 10/441* (2013.01); *H01M 10/446* (2013.01); *H01M 10/448* (2013.01); *Y02T 10/7005* (2013.01); *Y02T 10/7055* (2013.01); *Y02T 10/7061* (2013.01)

(58) Field of Classification Search
CPC ... H02J 7/0014; H01M 10/44; H01M 10/441; H01M 10/446; H01M 10/448
USPC ......... 320/103, 104, 127, 128, 131, 132, 133, 320/135, 116, 118
See application file for complete search history.

(56) References Cited

U.S. PATENT DOCUMENTS

| | | | | |
|---|---|---|---|---|
| 6,225,780 B1 * | 5/2001 | Koch | ................. | H02J 7/0013 320/118 |
| 7,859,227 B2 | 12/2010 | Saigo | | |
| 8,273,483 B2 * | 9/2012 | Pozin et al. | ................. | 429/324 |
| 8,288,991 B2 * | 10/2012 | Sardat et al. | ................. | 320/118 |
| 8,350,528 B2 * | 1/2013 | Yang et al. | ................. | 320/118 |
| 8,676,419 B2 * | 3/2014 | Blakemore et al. | ................. | 701/22 |
| 8,710,800 B2 * | 4/2014 | Gibbs | ................. | H01M 10/441 320/116 |

(Continued)

FOREIGN PATENT DOCUMENTS

| | | |
|---|---|---|
| JP | 2003-309931 A | 10/2003 |
| JP | 2006-166615 A | 6/2006 |

*Primary Examiner* — Stacy Whitmore
(74) *Attorney, Agent, or Firm* — Birch, Stewart, Kolasch & Birch, LLP

(57) ABSTRACT

The battery management unit for a vehicle includes a charger mounted on the vehicle, configured to connect to an external power source and charge an assembled battery including a plurality of cells with electric power from the external power source; a memory that records which cell is a lowest cell having the lowest voltage when the battery is fully charged; and a cell-balancer that carries out cell-balancing on the voltage of the battery by discharging, when the charger is not charging the battery, the cells having a voltage higher than a current voltage of the lowest cell to the current value of the lowest cell.
Thereby, it is possible to suppress an increase in dispersion of voltages and reduction in battery capacity.

6 Claims, 7 Drawing Sheets

(56) References Cited

U.S. PATENT DOCUMENTS

| | | | |
|---|---|---|---|
| 8,847,550 B2 * | 9/2014 | Yanagihara et al. | 320/118 |
| 8,868,279 B2 * | 10/2014 | Blakemore | B60L 11/14 320/133 |
| 8,963,551 B2 * | 2/2015 | Ishishita | 324/430 |
| 8,981,729 B2 * | 3/2015 | Machida | B60L 11/1809 320/104 |
| 2004/0018419 A1 | 1/2004 | Sugimoto et al. | |
| 2006/0119319 A1 | 6/2006 | Sakurai et al. | |
| 2008/0084182 A1 * | 4/2008 | Oberlin et al. | 320/116 |
| 2010/0320971 A1 * | 12/2010 | Zhu et al. | 320/134 |
| 2011/0234170 A1 | 9/2011 | Zhang | |
| 2012/0139491 A1 * | 6/2012 | Eberhard et al. | 320/118 |
| 2012/0139495 A1 * | 6/2012 | Nortman et al. | 320/128 |
| 2012/0161707 A1 | 6/2012 | Kim | |
| 2012/0161709 A1 | 6/2012 | Fujii et al. | |
| 2012/0169297 A1 * | 7/2012 | Schaefer et al. | 320/150 |
| 2012/0286737 A1 * | 11/2012 | Yen | 320/134 |
| 2013/0026989 A1 * | 1/2013 | Gibbs | H01M 10/441 320/116 |
| 2013/0030620 A1 * | 1/2013 | Blakemore | H01M 10/42 701/22 |
| 2014/0375270 A1 * | 12/2014 | Coe et al. | 320/112 |

* cited by examiner

VEHICLE BATTERY MANAGEMENT UNIT HAVING CELL BALANCER BASED ON CAPACITY DIFFERENCES OF BATTERY CELLS

CROSS-REFERENCE TO THE RELATED APPLICATION

This application incorporates by references the subject matter of Application No. 2012-154665 filed in Japan on Jul. 10, 2012 on which a priority claim is based under 35 U.S.C. §119(a).

FIELD

The present invention relates to a battery management unit that controls charging and discharging of an assembled battery mounted on a vehicle.

BACKGROUND

In relation to a conventional assembled battery formed by coupling multiple secondary battery cells, one of known techniques balances (equalizes) the voltages of the respective cells when the cells are being used or being charged. Specifically, this technique balances the respective voltages of the cells to reduce the dispersion of voltages (differences of the voltages), aiming at maximizing the battery capacity of the entire assembled battery. Balancing cell voltages while the assembled battery is being charged makes it possible to increase, until the highest voltage of a cell among the multiple cells included in the assembled battery exceeds the upper limit voltage, amounts of electric power charging the remaining cells. Similarly, balancing cell voltages while the assembled battery is being used makes it possible to increase usable electric power of the entire assembled battery. In other words, this can suppress reduction in available battery capacity.

There are two typical schemes to balance the cell voltage. One scheme is to discharge cells having high voltages to reduce the voltages thereof, so that the voltages of all the cells are balanced. One of the examples of this scheme has a configuration in which a resistor and a switch that consume charged electric power are connected in parallel to each cell and balances the voltages of the respective cells by controlling connection and disconnection of the respective switches (e.g., Patent Literature 1: Japanese Laid-Open Patent Publication No. 2003-309931).

The other scheme is to transfer electric power of cells having high voltages to cells having low voltages. For example, each of cells is disconnectably connected to a coil which is magnetically coupled with the each other coils. Electric power is transferred from cells having high voltages to cells having low voltages using electromagnetic induction (e.g., Patent Literature 2: Japanese Laid-Open Patent Publication No. 2006-166615). In either scheme, one or more cells having high voltage among all the cells are detected. The voltage of the high-voltage cells is reduced in order to balance (equalize) the voltage of the entire assembled battery.

Conventional cell-balancing control (equalization control) on cell voltage is carried out on the basis of the cell having the lowest voltage at the time.

For example, the technique disclosed in Patent Literature 1 specifies a cell having the lowest voltage when the total voltage of the assembled battery is equal to or lower than the target voltage. And the technique controls the time of discharging each remaining cell on the basis of the difference between the voltage of the remaining cell and the lowest-voltage cell.

The technique of Patent Literature 2 monitors voltages of the respective cells at any time and controls a time of activating the voltage balancer circuit on the basis of the difference between the highest voltage and the lowest voltage among the monitored voltages.

However, individual secondary battery cells are different in charging-discharging characteristics, so that the characteristics of the cells in the assembled battery are not uniformly degraded. This means that a change in a charged amount or a change in a charging rate may vary a cell having the lowest voltage among the multiple cells. Accordingly, if the voltages of multiple cells are to be balanced while the assembled battery is being used, the cell having the lowest voltage when the cell-balancing being carried out may not always have the lowest-voltage cell after the assembled battery is charged. There is a possibility that the dispersion of voltages rather increases because the cell-balancing is performed on the basis of the lowest voltage at the time.

The assembled batteries are used in vehicles in different manners according to the kind of vehicle, and the difference may affect the dispersion of voltages. For example, an electric vehicle relatively frequently undergoes external charging and consequently balancing of cell voltages can be carried out each time the vehicle undergoes external charging, so that the dispersion of voltage is less increased. The cell-balancing uses electric power from an external power source and therefore can escape from power shortage even if the cell-balancing takes a long time. Advantageously, an optimum state of cell voltages can be relatively easily kept.

In contrast, a plug-in hybrid vehicle, which is capable of charging the assembled battery with electric power generated by the vehicle per se, less frequently undergoes external charging than an electric vehicle. For the above, cell-balancing performed only when external charging as performed in an electric vehicle does not ensure sufficient frequency of the cell-balancing and therefore has a difficulty in preferably suppressing the dispersion of voltages. One solution to ensure sufficient frequency of the cell-balancing is to carry out the cell-balancing also when the vehicle is not undergoing external charging, which forces the vehicle to generate electric power to be consumed during the cell-balancing. Consequently, a longer time that the cell-balancing takes consumes a larger amount of electric power to degrade the fuel efficiency and the electric efficiency. Unfortunately, conventional manners of balancing of cell voltages have a problem that the dispersion of voltages of the cells is not appropriately controlled in some kinds of vehicle and/or in some manners of using an assembled battery.

SUMMARY

Technical Problems

With the foregoing problems in view, an object of the present embodiment is to provide a battery management unit for a battery mounted on a vehicle which unit is capable of suppressing the dispersion of voltages when the battery is fully charged and also suppressing increase in the dispersion caused by change in a state of charge. In addition to the above object, advantageous effects that are derived from the structure according to each embodiment to be detailed below, but the conventional art has not achieved, can be regarded as other objects of the present invention.

Solution to Problems (1) The battery management unit for a vehicle disclosed herein includes: A charger mounted on the vehicle, configured to connect to an external power source and charge an assembled battery including a plurality of cells with electric power from the external power source; and a memory that records which cell is a lowest cell having the lowest voltage when the assembled battery is fully charged by the external power source among the plurality of cells.

The battery management unit further includes a cell-balancer that carries out cell-balancing on the voltage of the assembled battery by discharging, when the charger is not charging the assembled battery, one or more cells each currently having a voltage higher than a current voltage of the lowest cell to the current voltage of the lowest cell.

That is to say, the "lowest cell" is a name of what used to have the lowest voltage when the battery was fully charged in the last external charge, for example. The memory does not record the lowest voltage at full charge, but record that which cell is a "lowest cell". In the cell-balancing, the current voltage of the "lowest cell" is considered as a target voltage. The cell-balancer controls the voltage, which is higher than the current voltage of the "lowest cell", to the target voltage.

Specifically, the cell-balancer carries out cell-balancing on the voltages of the plurality of cells on the basis of the current voltage of the lowest cell even if the lowest cell does not have the lowest voltages at the time of carrying out the cell-balancing. The cell-balancing of the voltages of the plurality of cells is preferably carried out under a state where the battery has a small load, such as while the vehicle is running or stopping.

The control carried out by the cell-balancer is also referred to as "equalization", "voltage equalization", "balancer control", "balancing control", and others. The word "cell-balancing" here means that to balance or to equalize the voltages of the respective cells (i.e., the plurality of cells).

(2) As a preferable feature, the battery management unit may further include a calculator that calculates a cell capacity difference based on the difference between a lowest voltage and a highest voltage among voltages of the plurality of cells when the assembled battery is fully charged; and a setter that sets an upper limit of cumulative time of carrying out the cell-balancing based on a consumption electric current of the cell-balancing and the cell capacity difference calculated by the calculator. In this case, the cell-balancer may preferably prohibit the cell-balancing from being carried out for cumulative time longer than the upper limit set by the setter.

(3) As another preferable feature, the setter may reset the upper limit whenever the assembled battery is fully charged. In other words, when the battery is fully charged under a state where the cell-balancing is prohibited from being carried out for a cumulative time longer than the upper limit, the setter resets the setting so as to allow the cell-balancing to be carried out again.

(4) As an additional preferable feature, one of the conditions to carry out the cell-balancing is that the cell-balancer sets the absolute value of charging or discharging electric current being less than a criterial value. Namely, the cell-balancing is preferably carried out only when the electric load on the assembled battery is relatively small.

Advantageous Effects

According to the battery management unit for a vehicle disclosed herein, balancer control that discharges one or more cells each currently having a voltage higher than an open-circuit voltage (a current voltage) of the lowest cell, which is regarded as a target voltage, to the target voltage is carried out, and thereby the dispersion of battery capacities when the respective cells are fully charged again can be reduced. Even under the presence of a cell having a voltage lower than the current voltage of the lowest cell, it is possible to suppress an increase in dispersion of voltages which is caused by change in chargeable amount. Accordingly, it is possible to suppress reduction in battery capacity usable as the entire assembled battery.

BRIEF DESCRIPTION OF DRAWINGS

The nature of this invention, as well as other objects and advantages thereof, will be explained in the following with reference to the accompanying drawings, in which like reference characters designate the same or similar parts throughout the figures and wherein.

DESCRIPTION OF EMBODIMENTS

Description will now be made in relation to a battery management unit with reference to accompanying drawings. The following embodiments and modification are merely exemplary, and there is no intention of excluding another modification and application of techniques that are not mentioned in the following description. The elements of the following embodiments can be changed or modified without departing the subject matter and may be omitted and properly combined as occasion demands.

Figure 1:
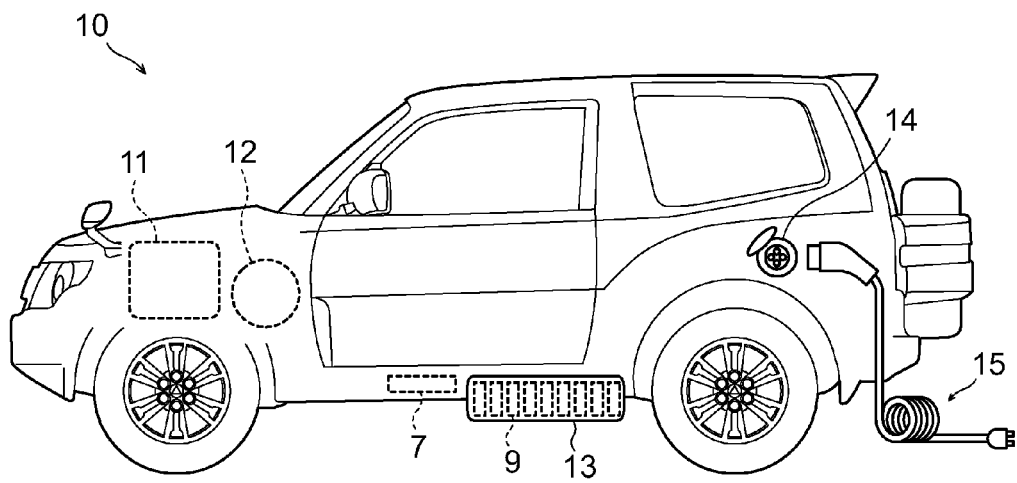
FIG. 1 is a side view illustrating an example of a vehicle applied a battery management unit according to a first embodiment.

1. Configuration of a Battery Management Unit:

A battery management unit (BMU) 7 of a first embodiment is applied to a vehicle 10 of FIG. 1. The vehicle 10 is a plug-in hybrid vehicle that travels using an engine 11 and a motor 12 in combination with each other. A battery 13, which is a power source of the motor 12, is mounted at an arbitrary position of the vehicle 10.

The motor 12 is a motor generator having functions of: using the electric power of the battery 13 to drive the vehicle 10; and generating (regenerating) electric power by using the inertia of the vehicle 10 being running. These two functions are properly controlled in accordance with the running state of the vehicle 10.

The battery 13 contains multiple battery modules coupled to one another. A battery module is an assembled battery formed by coupling many lithium-ion secondary battery cells 9 to one another. The cells 9 may be coupled to one another in any manner and similarly, the battery modules may be coupled to one another in any manner. These coupling manners may be serial, parallel, or a combination of serial and parallel, and are determined in accordance with, for example, values of the rated voltage and the rated electric current expected for the battery 13. A battery module can be regarded as an assembled battery including multiple cells 9 each being regarded as a unit battery and the battery 13 can be regarded as an assembled battery including multiple cells 9 or battery modules each being regarded as a unit battery.

The state of charging and discharging of the battery 13 is grasped and managed by the BMU 7, which is an electronic control unit formed of a microcomputer. Examples of the BMU 7 are a microprocessor, an LSI (large scale integration) device and an embedded electronic device in which a CPU (central processing unit), a ROM (read only memory), and/or a RAM (random access memory) which are known to the public are integrated.

The battery 13 of the first embodiment is assumed to be chargeable in two methods of: charging with electric power supplied from an external power source; and charging with electric power generated by rotation of the motor 12 or other element. Dispersion of self-discharging characteristics and dispersion of cell capacities may cause the cells 9 included in the battery 13 when being charged to have dispersion of voltages thereof. For the above, the BMU 7 carries out a cell-balancer control (cell-balancing control, equalization) that balances the voltages of the respective cells 9 included in the battery 13.

The vehicle 10 includes a charge inlet 14 (electric power inlet, charger) that is an interface to connect the vehicle 10 to a charge cable 15 on the outer surface thereof. The charge cable 15 couples the vehicle 10 with a non-illustrated external power source supplier when the battery 13 is to be charged from an external power source. Hereinafter, charging the battery 13 from an external power source is referred to as "external charging".

In external charging, the vehicle 10 is coupled to an external power source by plugging a charge cable 15 into the charge inlet 14. Accordingly, the charge inlet 14 and the charge cable 15 collectively function as charging device (charger) that charges the battery 13 with electric power from an external power source.

In the first embodiment, description will be mainly made in relation to the balancer control carried out while the vehicle 10 is running (including, for example, brief stopping and halting while external charging is not being carried out). However, the balancer control can be of course carried out during external charging.

Figure 2:
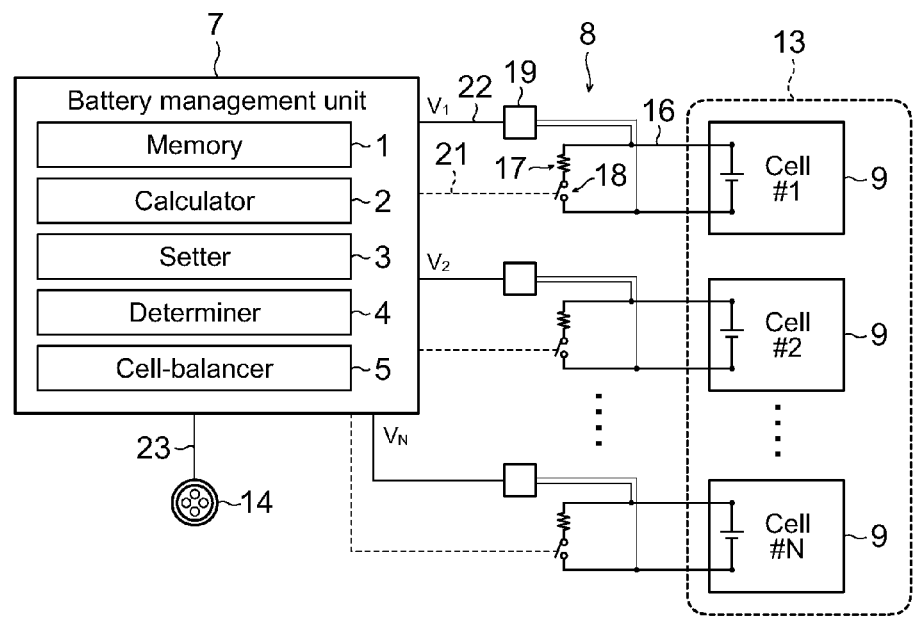
FIG. 2 is a circuit diagram and a block diagram denoting balancer control carried out in the battery management unit of FIG. 1.

FIG. 2 schematically illustrates an example of the configuration of an electric circuit to carry out the balancer control. A balancer circuit (equalization circuit) 8 is coupled to each cell 9 included in the battery 13. The balancer circuit 8 has a function to change the open-circuit voltage of the cell 9. A typical balancer circuit 8 has a resistor bypass circuit that connects the electrodes of the cell 9 to each other. Each balancer circuit 8 includes a circuit element 16, a resistor 17, and a switch 18 that are disposed between the both electrodes of the corresponding cell 9, and a voltage obtainer 19. The resistor 17, and the switch 18 are serially interposed in the circuit element 16.

The resistor 17 consumes electric power stored in the corresponding cell 9 by converting the electric power to heat. The switch 18 opens and closes in accordance with the state of storing electric power in the corresponding cell 9 and thereby controls the state of electric current passing through the circuit element 16. A control line 21 which switches the open/close state (on/off state) of the switch 18 is disposed between the BMU 7 and the switch 18.

The voltage obtainer 19 detects the open-circuit voltage (non-loaded voltage) of the corresponding cell 9. The open-circuit voltage corresponds to a difference of electric potentials between two points sandwiching both resistor 17 and the switch 18 on the circuit element 16 under a state where the cell 9 has no load. Hereinafter, a open-circuit voltage of a cell 9 is also referred to as a "voltage". The data (information) of the voltage detected by the voltage obtainer 19 is notified to the BMU 7 through a signal line 22.

The BMU 7 is coupled to the charge inlet 14 via a signal line 23 through which information of a state of electric power supply from the charge cable 15 is notified to the charge inlet 14. Examples of the information that the signal line 23 notifies are whether the electric power is supplied to the charge inlet 14 and whether the charge cable 15 is plugged in the charge inlet 14. On the basis of the information notified through the signal line 23, the BMU 7 determines whether external charging is being carried out.

2. Detailed Manner of Balancer Control:

As illustrated in FIG. 2, the BMU 7 includes a memory 1 (memory unit, memory device), a calculator 2 (calculation unit, calculation device), a setter 3 (setting unit, setting device), a determiner 4 (unit or device of conditional judgment), and a cell-balancer 5 (cell-balancing controller, cell-balancing unit, cell-balancing device, equalizing unit, equalizing device). These elements may be achieved by one or more electronic circuits (hardware) or may be implemented by programmed software. Otherwise, part of the functions may be achieved by hardware and the remaining functions may be implemented by software.

The memory 1 receives information of the voltages input through the multiple signal lines 22 and stores the information of the voltages in association with the numbers of the cells 9 corresponding to the signal lines 22. In FIG. 2, the respective cells 9 are assigned unique cell numbers #1, #2, #N, and information of the voltages of the respective cells is represented by $V_1, V_2, \ldots, V_N$ by using the subscripts of the corresponding cell numbers. The memory 1 obtains the real-time information of the voltages of the respective cells 9 and stores the obtained information.

The memory 1 records which cell is the cell having the lowest voltage when the cells 9 are fully charged upon completion of external charging of the battery 13 among the multiple cells 9. For example, if the voltage information $V_1$ is the lowest when the battery 13 is fully charged, the memory 1 records therein the cell number #1 corresponding to the voltage information $V_1$. Hereinafter, a cell 9 having the lowest voltage when the battery 13 was fully charged is called the "lowest cell". The information of the cell number of the lowest cell is unchanged and retained until the battery 13 comes to be fully charged by the external charging again. The "lowest cell" is a name of what used to have the lowest voltage when the battery was fully charged. Therefore, the "lowest cell" does not always have a lowest voltage in the battery 13.

The calculator 2 carries out two kinds of calculation. First, upon completion of external charging, the calculator 2 calculates a voltage difference $\Delta V_X$ between the lowest voltage $V_{XMIN}$ and the highest voltage $V_{XMAX}$ among the respective voltages of the cells 9 when the battery 13 comes to be fully charged, and further calculates a capacity difference $\Delta C$ corresponding to the voltage difference $\Delta V_X$ when the battery 13 is fully charged ($\Delta V_X = V_{XMAX} - V_{XMIN}$). The capacity difference $\Delta C$ is calculated from a mathematical expression, a map, or other means that expresses the association of a voltage with a battery capacity. The information of the calculated capacity difference $\Delta C$ is notified to the setter 3.

Figure 3:
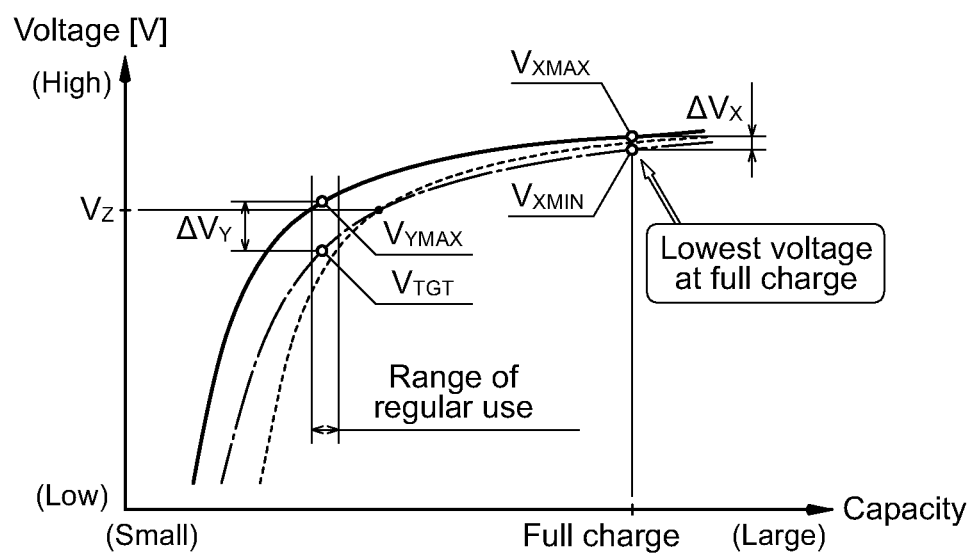
FIG. 3 is a graph depicting an example of the charging-discharging characteristics of respective cells included in an assembled battery of FIG. 1.

In contrast, while external charging is not being carried out, the calculator 2 regards a current voltage of the lowest cell, the value being stored in the memory 1, as a target voltage $V_{TGT}$ and calculates the voltage difference $\Delta V_Y$ between the maximum voltage $V_{YMAX}$ among the current value of voltages of the cells 9 and the target voltage $V_{TGT}$. The target voltage $V_{TGT}$ is a current voltage of a cell 9 that used to have the lowest voltage when the battery 13 was fully charged. The target voltage $V_{TGT}$ is not always the lowest among the current voltages (at the time) of all the cells 9. For example, as illustrated in the graph of FIG. 3, which represents charging-discharging characteristics by plotting relationship between the open-circuit voltages and battery capacities of the respective cells 9, a broken line and a chain line are crossing each other. That is, the broken line is located upper than the chain line at full charge. But the broken line is located lower than the chain line at low charge. The magnitude relation of the open-circuit voltages of cells 9 at the same capacity may be turned over with the capacity.

Here, a voltage at which the broken line crosses the chain line is called the intersection voltage $V_z$. In the region in which the lowest cell has a voltage lower than the intersection voltage $V_z$, since a cell having a lower voltage (represented by the broken line) than a voltage of the lowest cell (represented by the chain line) at the same capacity is present, the target voltage $V_{TGT}$ is not the lowest at the time. In particular, since the batteries 13 of some hybrid vehicles are set the target capacity (target charging rate) while the vehicle 10 is running to be around 50%, there is a possibility that a cell 9 is repeatedly used in the voltage region lower than the intersection voltage $V_z$. Even in the above region of the capacity, the calculator 2 still regards the current voltage of the lowest cell as the target voltage $V_{TGT}$. The information of the voltage difference $\Delta V_Y$ calculated by the calculator 2 is notified to the determiner 4.

The setter 3 sets an allowable time $T_{MAX}$ of balancer control on the basis of an operational electric current I of the balancer circuit 8 and the capacity difference $\Delta C$ calculated by the calculator 2. The operational electric current I of the balancer circuit 8 is an electric current that passes through the resistor 17 when the switch 18 is turned on. The allowable time $T_{MAX}$ of balancer control is the upper limit of a cumulative time of activating the balancer circuit 8. In other words, allowable time $T_{MAX}$ is the upper limit of a cumulative time T of carrying out the balancer control. For example, the allowable time $T_{MAX}$ of balancer control is calculated by dividing the capacity difference $\Delta C$ by the operational electric current I (e.g. $T_{MAX} = f(\Delta C/I)$). The allowable time $T_{MAX}$ set by the setter 3 is notified to the cell-balancer 5.

The capacity difference $\Delta C$ is correlated with the voltage difference $\Delta V_X$ between the lowest voltage $V_{XMIN}$ and the highest voltage $V_{XMAX}$ among the respective voltages of the cells 9 when the battery 13 is fully charged (e.g. $\Delta C = f(\Delta V_X) = f(V_{XMAX} - V_{XMIN})$). Therefore, when the battery 13 comes to be fully charged again by external charging, the voltage difference $\Delta V_X$ changes and the capacity difference $\Delta C$ also changes. For the above, the setter 3 sets a new allowable time $T_{MAX}$ each time the capacity difference $\Delta C$ is updated due to fully charging the battery 13.

The determiner 4 determines whether various conditions to carry out balancer control are each satisfied, the balancer control which is performed by balancing (equalizing) the voltages of the cells 9 by activating the balancer circuits 8. Here, when all the following Conditions 1-4 are satisfied, the determiner 4 determines that the condition to carry out the balancer control is satisfied. On the other hand, when any one of Conditions 1-4 is not satisfied, the determiner 4 determines that the condition to carry out the balancer control is not satisfied. The result of the determination by the determiner 4 is notified to the cell-balancer 5.

Condition 1: the vehicle 10 is not in external charging;
Condition 2: the battery 13 has small electric load;
Condition 3: the voltage difference $\Delta V_Y$ is exceeding a criterial voltage difference $\Delta V_{TH}$; and
Condition 4: the cumulative time T of carrying out the balancer control is less than the allowable time $T_{MAX}$.

Condition 1 is determined on the basis of the information notified from the charge inlet 14 through the signal line 23. For example, the condition 1 is satisfied when the vehicle 10 is not charged by external source or when the charge cable 15 is not connected to the vehicle 10.

Condition 2 is to confirm that the battery 13 is not being used or that, even if the battery 13 is being used, the battery 13 has a relatively small amount of charging or discharging per unit time. If the amount of charging or discharging the battery 13 is relatively large (that is, a large amount of electric power of the battery 13 is being consumed or an amount of electric power being regenerated is large), it is difficult to obtain exact open-circuit voltages of the respective cells 9 to further make it difficult to improve the accuracy the balancer control. In contrast, if the amount of charging or discharging the battery 13 is relatively small (that is, the vehicle 10 is running by consuming little electric power of the battery 13, the vehicle 10 is running using only the power generated by the engine 11, or the vehicle 10 is stopping, idling or so on.), the exact open-circuit voltages of the respective cells 9 can be obtained to further enhance the accuracy control of the balancer circuits 8.

Any manner can be applied to calculation of an amount of charging or discharging the battery 13. For example, the amount of charging or discharging the battery 13 may be based on an amount of decline in voltage of the battery 13 or a charging or discharging electric current of the battery 13. In the first embodiment, the electric load on the battery 13 is determined to be small when the absolute value of an electric current charging or discharging the battery 13 is less than a certain, criterial electric current value.

Condition 3 is determined by comparing the voltage difference $\Delta V_Y$ calculated by the calculator 2 with a criterial voltage difference $\Delta V_{TH}$. The criterial voltage difference $\Delta V_{TH}$ may be a fixed value given in advance according to the characteristics and/or the kind of the battery 13, or may be a variable set on the basis of the accumulated time of using the battery 13 or a charging ratio of the battery 13 (an average of charging ratios of the respective cells 9, the charging ratio of the lowest cell, state of charge as known as SoC or so on). As illustrated in FIG. 3, the dispersion of voltages derived from the charging-discharging characteristics of the respective cells 9 tends to increase as the battery capacities of the respective cells 9 reduce.

Condition 4 is determined by comparing the allowable time $T_{MAX}$ set by the setter 3 and the cumulative time T of carrying out the balancer control actually measured. The cumulative time T of carrying out the balancer control is cumulatively measured while the cell-balancer 5 that is to be detailed below carries out the balancer control. According to this condition, the cell-balancer 5 prohibits balancer control from being carried out longer than the allowable time $T_{MAX}$. In other words, the cumulative time T is not allowed to exceed the allowable time $T_{MAX}$.

The cell-balancer 5 (cell-balancing controller) carries out the balancer control, regarding a current voltage of the lowest cell that is stored in the memory 1 as the target value. Specifically, the target voltage $V_{TGT}$ for the balancer control of the first embodiment is not the lowest voltage at the time point of the control, but is the voltage of the lowest cell at the same time point. Accordingly, if a cell 9 has a voltage lower than the target voltage $V_{TGT}$ as illustrated in FIG. 3, the cell-balancer 5 excludes the cell 9 having lower voltages from the balancer control. This means that the balancer control is to be carried out on the cells 9 having higher voltages than the current voltage of the lowest cell at the time.

When the determiner 4 determines that the condition to carry out the balancer control is satisfied, the cell-balancer 5 outputs an "on" signal to the switches 18 of the cells 9 which currently have voltages higher than the target voltage $V_{TGT}$ to activate the respective balancer circuits 8. The cell-balancer 5 has a function of balancing the battery voltage by discharging the cells 9 having higher voltages than the target voltage $V_{TGT}$.

The cell-balancer 5 measures the cumulative time T of activating any balancer circuit 8 and notifies the measured cumulative time T to the determiner 4. The determiner 4 uses the information of the measured cumulative time T for determination on the above Condition 4. After the measured cumulative time T of carrying out the balancer control reaches the allowable time $T_{MAX}$, Condition 4 comes to be unsatisfied and the balancer control is not carried out any longer. The measured value of the cumulative time T of carrying out the balancer control is reset to zero each time the setter 3 sets a new allowable time $T_{MAX}$. This means that the cumulative time T is reset whenever the battery 13 comes to be fully charged as a result of external charging.

Figure 4:
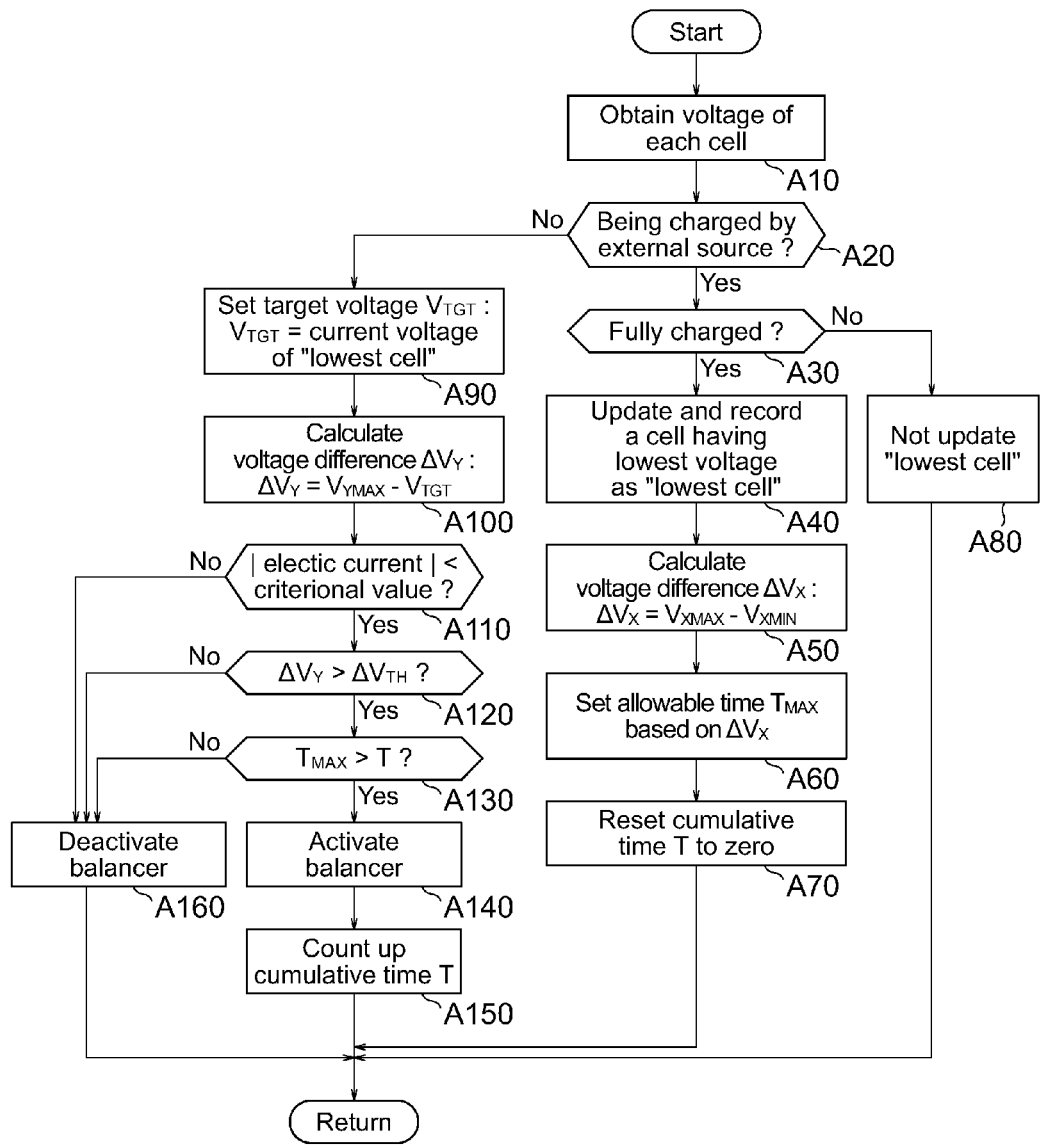
FIG. 4 is a flow diagram denoting a succession of procedural steps of balancer control.

3. Flow Diagram:

FIG. 4 is a flow diagram illustrating a succession of procedural steps of the balancer control carried out in the BMU 7. The procedural steps of this flow diagram are repeated at certain intervals (e.g., at a cycle of several dozen milliseconds). Here, description is made in relation to the balancer control carried out while the external charging of the vehicle 10 is not being carried out, but balancer control may be of course carried out during external charging.

In step A10, information of the open-circuit voltages of the respective cells 9 is input into the BMU 7 through the multiple signal lines 22 and is stored in the memory 1. In the next step A20, the determiner 4 determines, on the basis of the information notified from the charge inlet 14 through the signal line 23, whether the vehicle 10 is being subjected to external charging. This determination in step A20 corresponds to the above Condition 1. If the external charging is being carried out, the procedure proceeds to step A30 while if the external charging is not being carried out, the procedure proceeds to step A90.

In step A30, determination is made as to whether the battery 13 is in the state of being fully charged on the basis of information of the voltages of the respective cells 9 in, for example, the memory 1 and/or the calculator 2. If the battery 13 is determined to be in the fully-charged state, the procedure proceeds to step A40 and one of the cells 9 which has the lowest voltage is recorded to be the "lowest cell". At this time, if another cell has been recorded to be the lowest cell already, the information of the lowest cell is updated and stored in the memory 1. In the next step A50, the calculator 2 extracts information corresponding to the lowest voltage $V_{XMIN}$ and the highest voltage $V_{XMAX}$ from the information of the current voltages of the cells 9 stored in the memory 1 and then calculates the voltage difference $\Delta V_X$.

In step A60, the calculator 2 calculates the capacity difference $\Delta C$ corresponding to the voltage difference $\Delta V_X$ calculated in the previous step. The setter 3 divides the capacity difference $\Delta C$ by the operational electric current I of the balancer circuit 8 and sets the quotient to be the allowable time $T_{MAX}$ of balancer control. In the step A70, the cell-balancer 5 resets the cumulative time T of the balancer control to zero and terminates the corresponding series of procedural steps. If the battery 13 is determined not to be in the fully-charged state in step A30, the procedure proceeds to step A80 and the information of the lowest cell (i.e., the cell number thereof) is not updated and still held.

On the other hand, if the determiner 4 determines in step A20 that the external charging is not being carried out, the procedure proceeds to step A90. And the calculator 2 sets the current voltage that the "lowest cell" recorded in step A40 has at the time to be the target voltage $V_{TGT}$. In the continuous step A100, the calculator 2 calculates the voltage difference $\Delta V_Y$ between the current highest voltage $V_{YMAX}$ and the target voltage $V_{TGT}$.

In step A110, the determiner 4 determines whether the absolute value of the charging or discharging electric current of the battery 13 is less than a criterial electric current value. This determination in step A110 corresponds to Condition 2. Here, if the absolute value of the charging or discharging electric current of the battery 13 is less than the criterial electric current value, the determiner 4 determines that the battery 13 has small electric load and the procedure proceeds to step A120. In contrast, if the absolute value is not less than the criterial electric current value, the determiner 4 determines that the battery 13 has large electric load and the condition to carry out the balancer control is not satisfied. Consequently, the procedure proceeds to step A160.

In step A120, the determiner 4 determines whether the voltage difference $\Delta V_Y$ exceeds the criterial voltage difference $\Delta V_{TH}$. The determination in step A120 corresponds to the above Condition 3. If the voltage difference $\Delta V_Y$ exceeds the criterial voltage difference $\Delta V_{TH}$, Condition 3 is satisfied to determine the cells 9 have the large dispersion of voltages and the procedure proceeds to step A130. On the other hand, if Condition 3 is not satisfied, the condition to carry out the balancer control is determined not to be satisfied and the procedure proceeds to step A160.

In step A130, determination is made as to whether the cumulative time T of carrying out the balancer control is less than the allowable time $T_{MAX}$. This determination in step A130 corresponds to above Condition 4. If the cumulative time T of carrying out the balancer control is less than the allowable time $T_{MAX}$, Conditions 1-4 are all satisfied so that the condition to carry out the balancer control is satisfied. Consequently, the procedure proceeds to step A140. In step A140, the cell-balancer 5 outputs an "on" signal to the switches 18 of the cells 9 which currently have voltages higher than the target voltage $V_{TGT}$ and thereby activates the corresponding balancer circuits 8. At this time, the balancer control is not carried out on a cell 9 having a voltage less than the target voltage $V_{TGT}$ and the balancer circuit 8 of the cell 9 having the less voltage than the target voltage $V_{TGT}$ is not activated. In the next step A150, the cell-balancer 5 counts up (increases) the cumulative time T of carrying out the balancer control accordingly.

If the determination in step A130 is not satisfied, the condition to carry out the balancer control is determined not to be to satisfied and then the procedure proceeds to step A160. In step A160, all the balancer circuits 8 are refrained from being activated. Namely, all the balancer circuits 8 are not activated.

4. Effects:

4-1. Battery with Three Cells:

Here, description will now be made in relation to change in voltage of each cell 9 in course of the above balancer control with reference to FIGS. 5A-5D and 6A-6B, assuming that the battery 13 has three cells 9a, 9b, and 9c. In the drawings, the graphs of the charging-discharging characteristics of the cells 9a, 9b, and 9c are represented by the thick solid line, the broken line, and the chain line, respectively.

The cell 9a (represented by the thick solid line) has the highest voltage when the external charging is completed and thereby the battery 13 is fully charged while the cell 9c (represented by the chain line) has the lowest voltage under the fully-charged state. Namely, the cell 9c corresponds to the lowest cell. The cells 9b and 9c have the same capacity when having the intersection voltage $V_Z$, and the cell 9c has a higher voltage than that of the cell 9b at a region in which the voltage is lower than the intersection voltage $V_Z$.

Figure 5A:
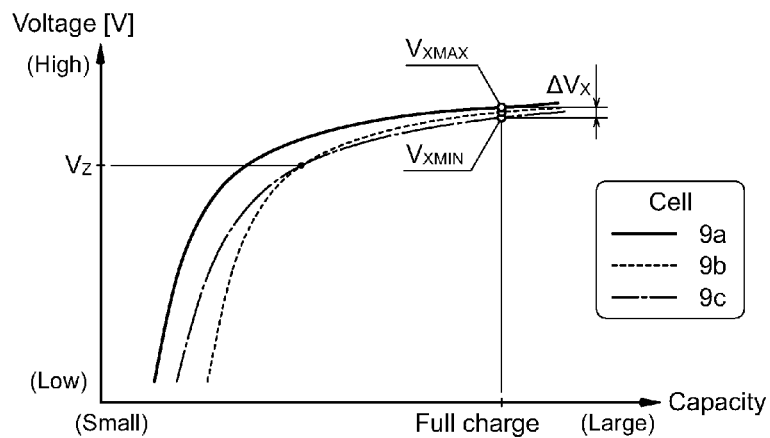
FIG. 5A is a graph denoting the charging-discharging characteristics of respective cells.

First, as depicted in FIG. 5A, when the battery 13 comes to be fully charged as the result of external charging, the voltage difference $\Delta V_X$ between the lowest voltage $V_{XMIN}$ and the highest voltage $V_{XMAX}$ is calculated, and then the allowable time $T_{MAX}$ of carrying out the balancer control is set on the basis of the capacity difference $\Delta C$, which corresponds to the voltage difference $\Delta V_X$.

Figure 5B:
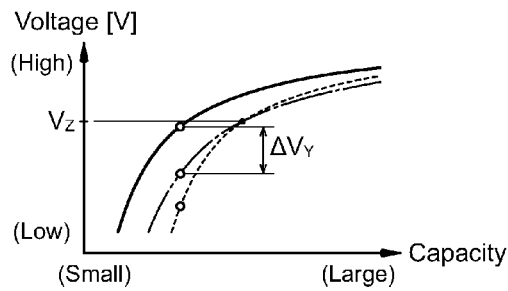
FIG. 5B is a graph denoting the states of voltages of respective cells while the vehicle is running (i.e., while not being charged)

After that, the engine 11 and the motor 12 start spinning and the vehicle 10 runs by consuming the electric power stored in the battery 13. While the vehicle 10 is running, the calculator 2 calculates the voltage difference $\Delta V_Y$ between the highest voltage $V_{YMAX}$ and the target voltage $V_{TGT}$ as depicted in FIG. 5B. The voltage difference $\Delta V_Y$ corresponds to the distance along the axis of ordinate between the thick solid line and the chain line. The electric power stored in the battery 13 is appropriately supplemented by typical electric power generation and regeneration, so that the voltages of the respective cells 9 are maintained to be certain values or higher.

If the voltage difference $\Delta V_Y$ exceeds the criterial voltage difference $\Delta V_{TH}$ under a state where the voltages of the cells 9a-9c are represented by the respective white dots in FIG. 5B, the above Condition 3 is satisfied. At this time, if the remaining Conditions 1, 2, and 4 are all satisfied, the balancer control is started. The balancer control will be carried out on only the cell 9a, which currently has a voltage higher than the target voltage $V_{TGT}$, and will not be carried out on the cell 9b.

The balancer control turns on the switch 18 of the balancer circuit 8 of the cell 9a, and thereby let electricity flow the corresponding resistor 17. The resistor 17 consumes the electric power stored in the cell 9a, so that the voltage of the cell 9a gradually falls as expressed by the arrow in FIG. 5C. The dispersion of voltages of the respective cell 9 corresponds to the dispersion of plots along the axis of ordinate of the graph. Therefore, the state of FIG. 5C has a smaller dispersion of voltages than that of FIG. 5B. However, it is difficult to illustrate, on the graph of FIG. 5C, the dispersion of voltages that would remain when the battery 13 in this state is going to be fully charged through external charging.

Figure 5C:
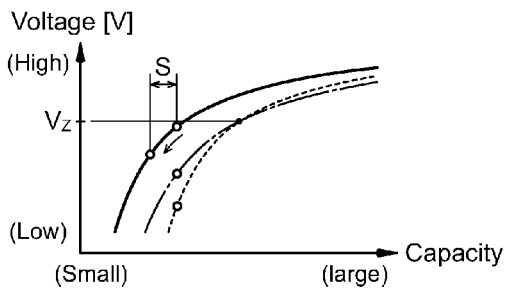
FIG. 5C is a graph denoting cell-balancing of voltages by the balancer control.
Figure 5D:
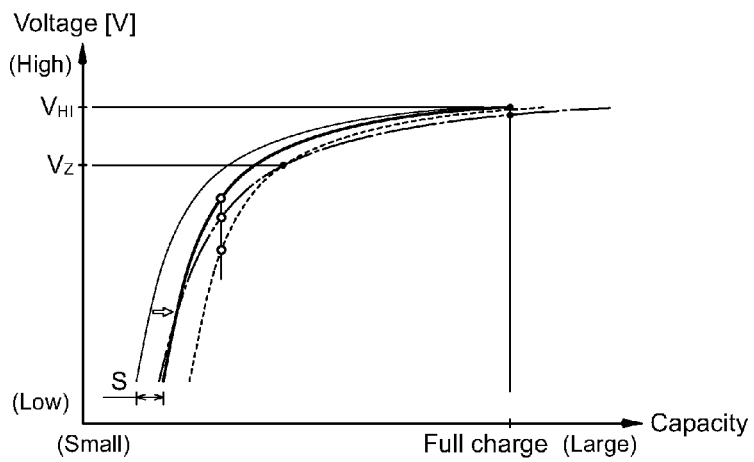
FIG. 5D is a graph in which the solid-line graph in FIG. 5C is horizontally moved along the abscissa.

In contrast, it is possible to intelligibly illustrate the dispersion of voltages when the battery 13 is going to be fully charged by horizontally translating the solid line graph of FIG. 5C along the axis of abscissa. FIG. 5D has graphs obtained by moving the thick solid line of FIG. 5C rightward such that the abscissas of the while dots of FIG. 5C, which represents the states of the respective cells 9a, 9b, 9c, coincide with one another. The thin solid line in FIG. 5D corresponds to the thick solid line in FIG. 5C; the thick solid line in FIG. 5D corresponds to a result of horizontally (i.e., along the axis of abscissa) moving the thin solid line by the distance S.

Providing that the battery capacities of the cells 9 almost uniformly increase during external charging, the longest distance along the axis of ordinate between two of the white dots—that is, the white dot representing the current highest cell voltage and the white dot representing the current lowest cell voltage—correspond to the extent of the dispersion of voltages remaining in the battery 13 at the time. Considering that the voltage of the battery 13 upon completion of external charging is restricted by the upper limit voltage $V_{HI}$, the highest voltage among the voltages of all the cells 9 becomes to the upper limit voltage $V_{HI}$.

Accordingly, among the three intersection points of the three graphs (the thick solid line, the broken line, and the chain line) and the horizontal line representing the upper limit voltage $V_{HI}$ in FIG. 5D, the leftmost intersection point (i.e., the lowest capacity) corresponds to the highest voltage when the battery 13 is fully charged. The voltages of the remaining cells 9 when the battery 13 is fully charged are represented by the points having the same abscissa as that of the highest voltage.

The extent of the dispersion of voltages of the cells 9 when the battery 13 is fully charged changes according to the distance S to move the thick solid line. Specifically, as depicted in FIG. 5C, the extent of the dispersion of voltages changes according to the amount of variation in battery capacity, which corresponds to the amount of variation in voltage of the cell 9a before and after the balancer control.

Figure 6A:
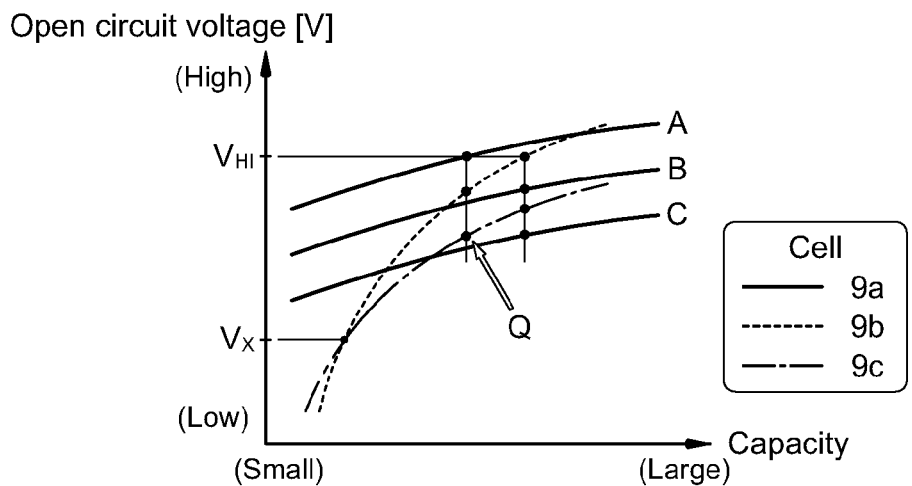
FIG. 6A is a graph denoting an enlargement of a portion close to the full-charging point of FIG. 5D.

FIG. 6A is an enlargement of a portion close to the full-charging point of FIG. 5D. When the graph of the charging-discharging characteristics of the cell 9a is represented by the solid line A in FIG. 6A—in other words, when the cell 9a has the upper limit voltage $V_{HI}$ under a state where the battery 13 is fully charged—the extent of the dispersion of voltages depends on the voltage of the cell 9a and the voltage of the cell 9c. As long as the cell 9a has the upper limit voltage $V_{HI}$, a longer distance S to move the thick solid line increases the capacity of the cell 9a when the battery 13 is fully charged, so that the dispersion of voltages of the battery 13 reduces.

When the graph of the charging-discharging characteristics of the cell 9a is represented by the solid line B in FIG. 6A—in other words, when the cell 9b has the upper limit voltage $V_{HI}$ under a state where the battery 13 is fully charged—the extent of the dispersion of voltages depends on the voltage of the cell 9b and the voltage of the cell 9c. The voltage of the cell 9a is a value between the voltages of the cells 9b and 9c. As the above, when the voltage of the cell 9a is smaller than the upper limit voltage $V_{HI}$ and is also higher than the voltage of the cell 9c, the dispersion of voltages of the battery 13 is constant regardless of the distance S to move the thick solid line.

When the graph of the charging-discharging characteristics of the cell 9a is represented by the solid line C in FIG. 6A, in other words, when the cell 9a has the lowest voltage $V_{XMIN}$ under a state where the battery 13 is fully charged, the extent of the dispersion of voltages depends on the voltage of the cell 9b and the voltage of the cell 9a. In this case, a longer distance S to move the thick to solid line reduces the voltage of the cell 9a when the battery 13 is fully charged and consequently increases the dispersion of voltages of the battery 13.

Figure 6B:
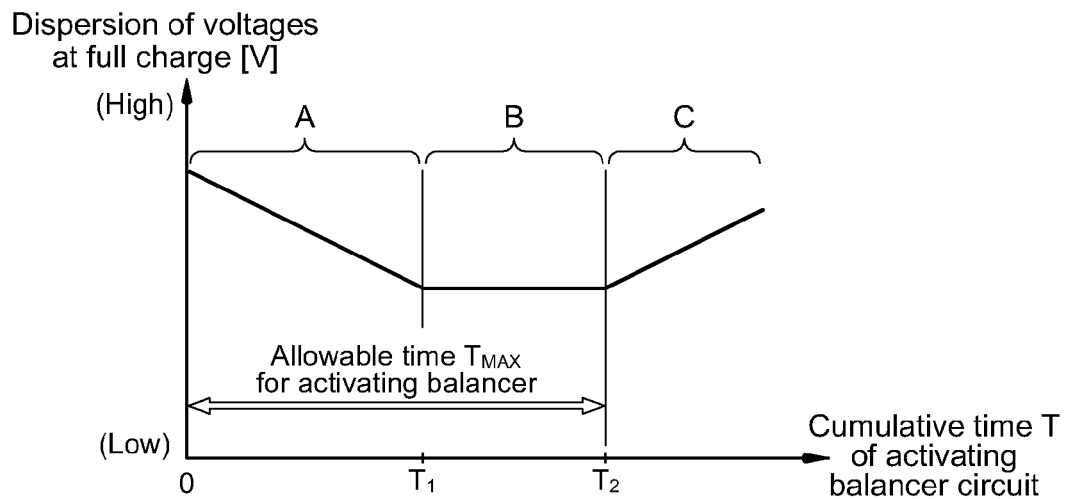
FIG. 6B is a graph denoting the relationship between the cumulative time T of carrying out the balancer control and the extent of dispersion of voltages.

FIG. 6B is a graph denoting the relationship between the cumulative time T of carrying out the balancer control and the extent of dispersion of voltages, which relationship correlates with the above distance S. Until the cumulative time T of carrying out the balancer control reaches a certain extent, the dispersion of voltages reduces in accordance with increase in cumulative time T. When the voltages at the intersection of the thick solid line and the broken line in FIG. 6A coincides with upper limit voltage $V_{HI}$ at the cumulative time T being $T_1$, the dispersion of voltages is constant. As long as an inequality "$T_1 \leq T \leq T_2$" is true, the dispersion of voltages is constant.

Furthermore, when the voltage at the intersection of the thick solid line and the chain line in FIG. 6A coincides with the lowest voltage $V_{XMIN}$ at the cumulative time T being $T_2$, the dispersion of voltages increases as the cumulative time T prolongs. The symbols A-C in FIG. 6B correspond to the states when the graph of the charging-discharging characteristics of the cell 9a is represented by the solid lines A-C, respectively, in FIG. 6A.

The calculator 2 in the BMU 7 calculates the voltage difference $\Delta V_X$ when the battery 13 is fully charged. The voltage difference $\Delta V_X$ is calculated by subtracting the lowest voltage $V_{XMIN}$ from the highest voltage $V_{XMAX}$. Both values of these voltages $\Delta V_{XMAX}$, $V_{XMIN}$ are detected values when the battery 13 is fully charged.

The calculator 2 in the BMU 7 also calculates the capacity difference $\Delta C$ corresponding to the voltage difference $\Delta V_X$. And then, the setter 3 sets the allowable time $T_{MAX}$ of balancer control, which corresponds to the quotient of the division of the capacity difference $\Delta C$ by the operational electric current I of the balancer circuit 8.

If the determiner 4 determines that the condition to carry out the balancer control is satisfied, the cell-balancer 5 starts balancer control. When the balancer circuit 8 reduces the voltage of the cell 9a to the substantially same as the voltage of the cell 9c under a state where the battery 13 is fully charged (i.e., in the range in which the allowable time $T_{MAX}$ at least satisfies the relationship $T_{MAX} \leq T_2$), the balancer control is prohibited from being performed any longer. In other words, the distance S to move the thick solid line in FIG. 6A is limited such that the thick solid line is prohibited from coming below the point Q. Accordingly, the dispersion of voltages when the battery 13 is fully charged is the substantially minimum value associated with the charging-discharging characteristics of the respective cells 9.

Figure 7A:
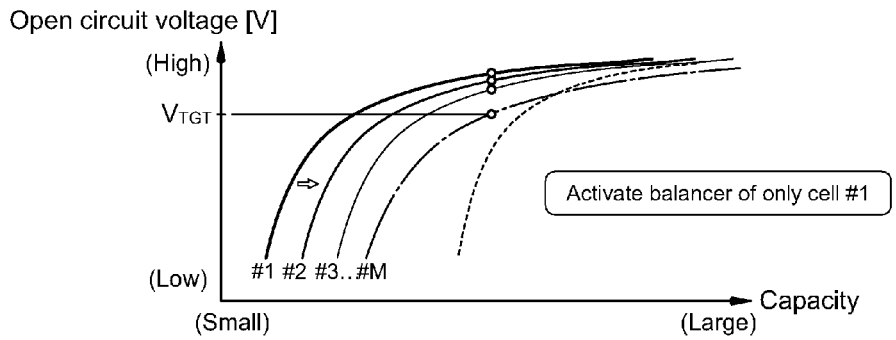
FIG. 7A is a graph denoting an example of states of voltages of respective cells when balancer control is being carried out.

4-2. Battery with M Cells:

FIGS. 7A-7D are graphs denoting the sequence of activating the balancer circuits 8 when the balancer control is to be carried out on M cells (where, M is a natural number). Here, as depicted in FIG. 7A, cell numbers #1, #2, #3, . . . , and #M are applied to cells 9 in the order of having higher voltages at the time of starting the balancer control, and a voltage of the cell having the cell number #M when the balancer control is to be carried out corresponds to the target voltage $V_{TGT}$.

The balancer circuit 8 of the cell having the cell number #1, which cell has the highest voltage among the cells having voltages higher than the target voltage $V_{TGT}$, is the first to be activated. The cell-balancer 5 activates only the balancer circuit 8 of the cell 9 having the cell number #1 towards the target voltage $V_{TGT}$ of the cell 9 having the cell number #M. This control corresponds to horizontally translating only the graph represented by the thick solid line of FIG. 7A along the axis of abscissa.

Figure 7B:
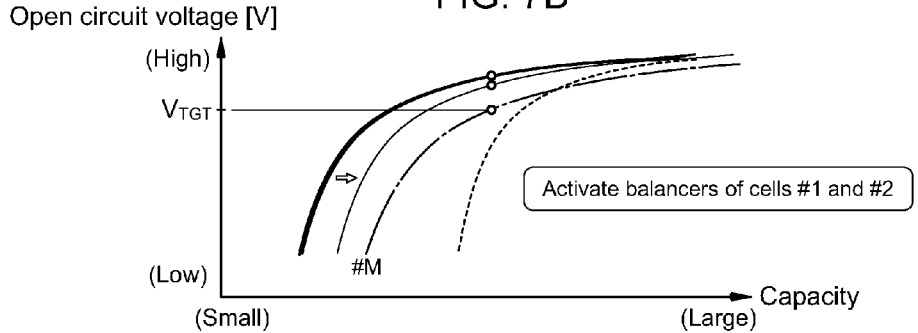
FIG. 7B is a graph denoting an example of states of voltages of respective cells when balancer control is being carried out.

After that, as depicted in FIG. 7B, the voltage of the cell 9 having the cell number #1 coincides with that of the cell 9 having the cell number #2, so that these two cells 9 have the current highest voltage. For the above, the cell-balancer 5 activates the balancer circuits 8 of the cells 9 having the cell numbers #1 and #2 towards the target voltage $V_{TGT}$ of the cell 9 having the cell number #M. This control corresponds to horizontally translating the graphs represented by the thick solid line and the middle solid line of FIG. 7B along the abscissa.

Figure 7C:
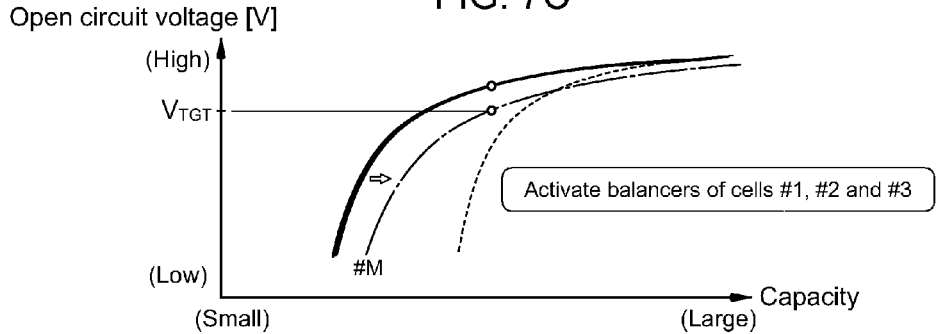
FIG. 7C is a graph denoting an example of states of voltages of respective cells when balancer control is being carried out.

Then, as depicted in FIG. 7C, when the voltage of the cells 9 having the cell numbers #1-#3 coincides with one another, these three cells 9 have the current highest voltage. For the above, the cell-balancer 5 activates the balancer circuits 8 of the cells 9 having the cell numbers #1-#3 such that the voltages of these cells come to be the target voltage $V_{TGT}$ of the cell 9 having the cell number #M. This control corresponds to horizontally translating all the three graphs represented by the thick solid line, the middle solid line, and the thin solid line of FIG. 7B along the abscissa.

Figure 7D:
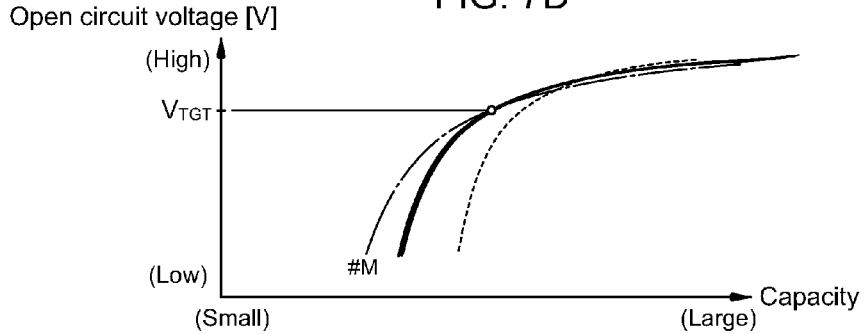
FIG. 7D is a graph denoting an example of states of voltages of respective cells when balancer control is being carried out.

When multiple cells are to be subjected to the balancer control, the respective balancer circuits 8 are to be activated in the order of higher voltages that the corresponding cells 9 have. In other words, the number of the working balancer circuit 8 increases as the cumulative time T of carrying out the balancer control increases. This means that, as depicted in FIGS. 7A-7D, the balancer control horizontally translates graphs in the order from the cell of the least deteriorating (represented by the leftmost graph)—that is, in the order of cells less deteriorating—such that the number of the graphs to be translated increase as time elapses. In addition, as depicted in FIG. 7D, when the cumulative time T reaches the allowable time $T_{MAX}$, the voltages of all the cells 9 having the cell numbers #1-#M come to be the substantially same as the target voltage $V_{TGT}$, so that the balancer control is completed.

Figure 8A:
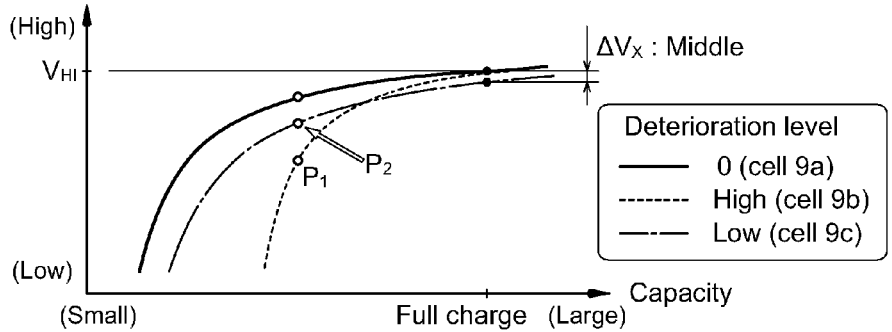
FIG. 8A is a graph denoting an extent of dispersion of voltage under balancer control when the cells are fully charged.
Figure 8B:
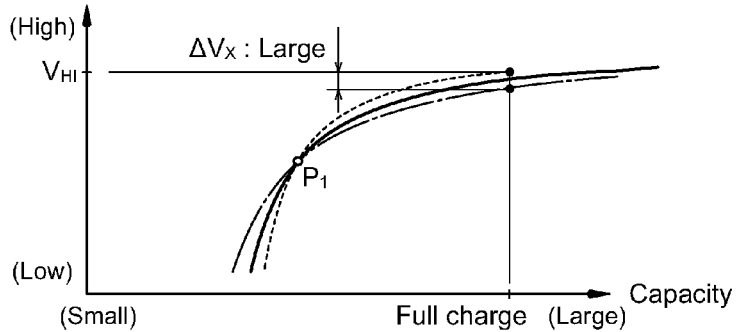
FIG. 8B is a graph denoting an extent of dispersion of voltage under balancer control when the cells are fully charged.
Figure 8C:
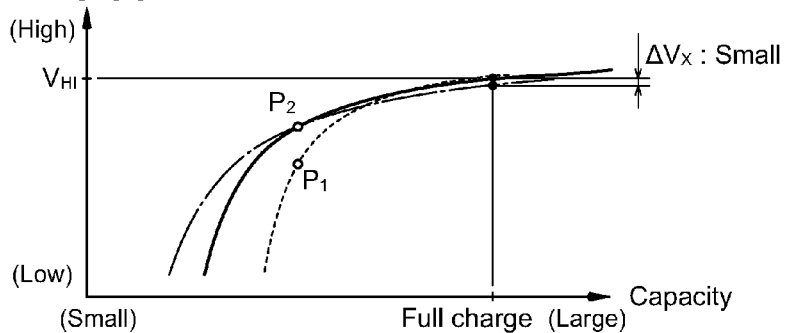
FIG. 8C is a graph denoting an extent of dispersion of voltage under balancer control when the cells are fully charged.

5. Change in Dispersion of Voltages:

FIGS. 8A-8C are graphs representing the results of simulating the extent of the dispersion of voltages of the cells when the battery 13 is fully charged, assuming that the cell 9a is a new that does not deteriorate and the degrees of deterioration of the cells 9b and 9c are large and small, respectively.

FIG. 8A is a graph of the charging-discharging characteristics of the cells 9a-9c. The extent of the dispersion of voltages when the battery 13 is fully charged corresponds to the distance along the axis of the ordinate between two black dots in FIG. 8A.

FIGS. 8B and 8C are graphs that forecast the change in the dispersion of voltages as a result of carrying balancer control performed when the voltages of the cells 9a-9c are in the states of the respective white dots of FIG. 8A while the battery 13 are being used.

First, when the balancer circuits 8 are activated on the basis of the cell 9b, which has the lowest voltage while the balancer control is about to be carried out, the balancer control is carried out such that the voltages of the cells 9a and 9c coincide with the voltage of the cell 9b. Accordingly, as depicted in FIG. 8B, the voltage difference $\Delta V_X$ between the solid line and the chain line, which are horizontally translated so as to be drawn through the point P1 under a circumstance where the battery 13 is fully charged, corresponds to the extent of dispersion of voltages. FIG. 8B depicts that the voltage difference $\Delta V_X$ increases from the initial voltage difference $\Delta V_X$ of FIG. 8A in this instance.

In contrast, when the balancer circuits 8 are activated on the basis of the cell 9c instead of the cell 9b, the balancer control is carried out such that the voltage of the cell 9a coincides with that of the cell 9c. Consequently, the cell 9b is excluded from the balance control. Accordingly, as depicted in FIG. 8C, the voltage difference $\Delta V_X$, when the solid line is horizontally translated so as to pass through the point P2 under a circumstance where the battery 13 is fully charged, corresponds to the extent of dispersion of voltages. FIG. 8C depicts that the voltage difference $\Delta V_X$ decreases from the initial voltage difference $\Delta V_X$ of FIG. 8A, which means the balancer control of FIG. 8C suppresses the dispersion of voltages.

6. Effects:

(1) As the above, the BMU 7 of the first embodiment carries out the balancer control using the open-circuit voltage of a cell which used to have the lowest voltage when the battery 13 was fully charged as the target voltage $V_{TGT}$. Namely, the balancer control is carried out on the basis of a current voltage of a cell which used to have the most inferior charging-discharging characteristic when the battery was fully charged, not on the basis of the lowest voltage when the balancer control is running. This control manner makes it possible to narrow the dispersion in battery capacity when the respective cells are fully charged again. Even if some cells have voltages lower than a current voltage of the lowest cell, the dispersion of voltages after the battery 13 is fully charged is prevented from increasing. Advantageously, this makes it possible to prevent the usable battery capacity of the entire battery 13 from reducing.

(2) As defined in Condition 1, the BMU 7 carries out the balancer control when the external charging is not being carried out. Accordingly, the dispersion of voltages of cells can be sufficiently suppressed not only on an electric vehicle which always needs external charging but also on, for example, a plug-in hybrid vehicle which is less subjected to external charging.

(3) The BMU 7 carries out the balancer control only on cells 9 having current voltage higher than a current voltage of the lowest cell, in other words, excludes cells 9 having current voltages lower than a current voltage of the lowest cell from cells to be subjected to the balancer control. The cells 9 to be excluded are estimated to have higher voltage than that of the lowest cell when the battery 13 is going to be fully charged next time. For the above, if the balancer control is carried out on cells 9 which have current voltages lower than a current value of the lowest cell such that the current voltages of the cells 9 are increased to the current voltage of the lowest cell, the dispersion in voltage of the cells when the battery 13 is fully charged again rather increases.

As a solution to the above, the BMU 7 excludes a cell having a current voltage lower than the current voltage of the lowest cell from the balancer control. This manner makes it possible to suppress the dispersion of voltages when the cells 9 are fully charged again, and consequently the dispersion of the battery capacity can also be suppressed.

Furthermore, since the balancer control is not carried out on a cell having a current voltage lower than the current voltage of the lowest cell 9, electric power used to balance the voltages of the respective cells can be saved, which means effectively suppression of dispersion of voltages.

(4) The BMU 7 sets the allowable time $T_{MAX}$ of carrying out the balancer control based on the capacity difference $\Delta C$ when the battery 13 is fully charged and the operational electric current I of the balancers 8. This can activate the balancer circuits 8 such that the dispersion of voltages when the battery 13 is fully charged is not excessively large as depicted in FIG. 6B. This avoids excessive cell-balancing and also reduces the dispersion of voltages that the cells 9 would have when the cells are to be fully charged again. Besides, the balancer control, which is carried out under a state where the vehicle 10 is not coupled to an external power source, is not excessively prolonged, so that the electric power to be consumed by the balancer circuits 8 can be saved, which enhances the fuel efficiency and the electric efficiency of the vehicle 10.

(5) Since the BMU 7 resets the allowable time $T_{MAX}$ of carrying out the balancer control whenever the battery 13 is fully charged, the charging voltages of the cells can further have a smaller dispersion of voltages because the cell-balancing is not excessively prohibited.

(6) Since the BMU 7 carries out the balancer control when at least Condition 2 is satisfied, that is, when the battery 13 has small electric load, the voltages of the respective cells 9 can be properly balanced and the accuracy in control can be enhanced.

(7) The BMU 7 carries out the balancer control when the vehicle 10 is in various states of, for example, running, stopping at a light, and halting, except for external charging. However, the balancer control can of course be carried out during external charging. In this case, the balancer control reduces the dispersion of voltages of the cells, consumed electric power by the balancer control performed during external charging can be reduced and also time taken for the charging can be shortened.

7. Modification:

In the first embodiment, each balancer circuit 8 is assumed to be a resistor bypass circuit, but is not limited to this. Alternatively, the balancer circuit 8 may have a configuration to control the voltages of the multiple cells 9 in a lump instead of the configuration to control the voltage of each individual cell 9, or may distribute electric power among the multiple cells 9.

If the voltages of multiple cells 9 are controlled in a lump, one scheme is to control the average voltage of the respective battery modules. In this case, a battery module including a cell which has the lowest voltage when the multiple battery modules are fully charged is treated the same as the lowest cell of the first embodiment and the remaining battery modules are treated the same as the remaining cells of the first embodiment, so that the same effects and advantages as the first embodiment can be attained.

The above first embodiment assumes the balancer control to be carried out on an assembled battery of a lithium-ion secondary battery. However, the kind of battery is not limited to this. Alternatively, the balancer control may be carried out on a lead-acid battery (a so-called 12-V battery) mounted on the vehicle 10, or on an assembled battery including lithium-ion capacitors, Nickel-Metal Hydride batteries, or alkaline-ion battery instead of a lithium-ion secondary battery.

Condition 3 of the first embodiment compares the largeness of the voltage difference $\Delta V_Y$ and the criterial voltage difference $\Delta V_{TH}$. Specifically, determiner 4 determines how high the highest voltage $V_{YMAX}$ is relative to the target voltage $V_{TGT}$. Determination of Condition 3 may be substituted by calculating the voltage difference $\Delta V_z$ between the voltage of each individual cell 9 and the target voltage $\Delta V_{TGT}$ and then comparing the largeness of the voltage difference $\Delta V_z$ with that of the criterial voltage difference $\Delta V_{TH}$. Specifically, determination as to whether the balancer control is to be carried out is made on each individual cell.

In the first embodiment, the balancer control is assumed to be carried out on a vehicle running (including stopping and halting, i.e., when not being subjected to external charging). Alternatively, the balancer control can be carried out also during external charging. As depicted in FIG. 3, if the battery 13 includes cells 9 which have open-circuit voltages whose largeness reverses in accordance with the capacity, the balancer control is carried out in a voltage region lower than the intersection voltage $V_Z$. This makes it possible to further reduce the dispersion of voltages when the battery 13 is fully charged as compared with conventional cell-balancing and also to suppress increase in dispersion of voltages caused by the change in chargeable amount related to deterioration of charging-discharging characteristics of the respective cells.

The invention thus described, it will be obvious that the same may be varied in many ways. Such variations are not to be regarded as a departure from the scope of the invention, and all such modifications as would be obvious to one skilled in the art are intended to be included within the scope of the following claims.

REFERENCE SIGNS LIST 1 memory
2 calculator
3 setter
4 determiner
5 cell-balancer
7 battery management unit
8 balancer circuit
9 cell
13 battery
14 inlet (charger)

What is claimed is:

1. A battery management unit for a vehicle comprising:
    a charger mounted on the vehicle, configured to connect to a commercial external power source and charge an assembled battery including a plurality of cells with electric power from the external power source;
    a memory that records which cell is a lowest cell having the lowest voltage when the assembled battery is fully charged by the external power source among the plurality of cells; and
    a cell-balancer that carries out cell-balancing on the voltage of the assembled battery by discharging, when the charger is not charging the assembled battery, one or more cells each currently having a voltage higher than a current voltage of the lowest cell to the current voltage of the lowest cell.

2. The battery management unit according to claim 1, further comprising:
    a calculator that calculates a cell capacity difference based on the difference between a lowest voltage and a highest voltage among voltages of the plurality of cells when the assembled battery is fully charged; and
    a setter that sets an upper limit of cumulative time of carrying out the cell-balancing based on a consumption electric current of the cell-balancing and the cell capacity difference calculated by the calculator, wherein
    the cell-balancer prohibits the cell-balancing from being carried out for cumulative time longer than the upper limit set by the setter.

3. The battery management unit according to claim 2, wherein the setter resets the upper limit whenever the assembled battery is fully charged.

4. The battery management unit according to claim 1, wherein one of the conditions to carry out the cell-balancing is that the cell-balancer sets the absolute value of charging or discharging electric current being less than a criterial value.

5. The battery management unit according to claim 2, wherein one of the conditions to carry out the cell-balancing is that the cell-balancer sets the absolute value of charging or discharging electric current being less than a criterial value.

6. The battery management unit according to claim 3, wherein one of the conditions to carry out the cell-balancing is that the cell-balancer sets the absolute value of charging or discharging electric current being less than a criterial value.

* * * * *